US009503562B2

(12) United States Patent
Negron et al.

(10) Patent No.: US 9,503,562 B2
(45) Date of Patent: Nov. 22, 2016

(54) SYSTEM AND METHOD FOR APPLIANCE CONTROL VIA A PERSONAL COMMUNICATION OR ENTERTAINMENT DEVICE

(75) Inventors: Eric Negron, New York, NY (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 810 days.

(21) Appl. No.: 12/406,601

(22) Filed: Mar. 18, 2009

(65) Prior Publication Data
US 2009/0239587 A1 Sep. 24, 2009

Related U.S. Application Data

(60) Provisional application No. 61/037,759, filed on Mar. 19, 2008.

(51) Int. Cl.
| | |
|---|---|
| H04N 5/44 | (2011.01) |
| H04M 1/725 | (2006.01) |
| H04M 11/00 | (2006.01) |
| G06F 3/0488 | (2013.01) |
| H04N 21/422 | (2011.01) |
| H05B 37/02 | (2006.01) |
| H04L 12/28 | (2006.01) |

(52) U.S. Cl.
CPC ...... *H04M 1/72533* (2013.01); *G06F 3/04883* (2013.01); *H04L 12/282* (2013.01); *H04L 12/2836* (2013.01); *H04N 21/42208* (2013.01); *H04N 21/42224* (2013.01); *H05B 37/0272* (2013.01); *H04L 2012/2841* (2013.01); *H04M 1/72583* (2013.01); *H04M 2250/22* (2013.01)

(58) Field of Classification Search
CPC ............ H04M 1/72533; H04M 11/007; H04N 5/4403
USPC ............ 455/566, 41.2, 41.3, 418, 419, 420; 379/102.01, 102.2, 102.3, 102.7; 348/734; 715/863
See application file for complete search history.

(56) References Cited

U.S. PATENT DOCUMENTS 5,757,360 A 5/1998 Nitta et al.
5,963,624 A * 10/1999 Pope ........................ 379/110.01
(Continued)

OTHER PUBLICATIONS

WIPO, International Preliminary Report on Patentability of PCT Appln. No. US09/37690, Sep. 21, 2010, 6 pages.
(Continued)

*Primary Examiner* — Christopher M Brandt
(74) *Attorney, Agent, or Firm* — Greenberg Traurig, LLP

(57) ABSTRACT

A system for use in controlling operating functions of a controllable device includes a hand-held device and an intermediate device in communication with the hand-held device and the controllable device. The hand-held device is adapted to receive a gesture based input and to transmit a signal having data representative of the gesture based input. The intermediate device has programming for translating the data representative of the gesture based input in a signal received from the hand-held device into a command signal to be communicated to the controllable device wherein the command signal has a format appropriate for controlling an operating function of the controllable device that is associated with the gesture based input.

21 Claims, 7 Drawing Sheets

(56) References Cited

U.S. PATENT DOCUMENTS

| | | | |
|---|---|---|---|
| 6,225,938 B1* | 5/2001 | Hayes | G11B 15/023 235/462.45 |
| 2002/0044199 A1* | 4/2002 | Barzebar et al. | 348/14.01 |
| 2004/0218104 A1 | 11/2004 | Smith | |
| 2005/0159823 A1 | 7/2005 | Hayes et al. | |
| 2005/0226201 A1* | 10/2005 | McMillin | 370/348 |
| 2006/0012488 A1* | 1/2006 | Hilbrink | G08C 17/00 340/12.22 |
| 2006/0148518 A1 | 7/2006 | Ferris | |
| 2006/0159116 A1* | 7/2006 | Gerszberg et al. | 370/431 |
| 2007/0008280 A1 | 1/2007 | Ullmann | |
| 2007/0171091 A1 | 7/2007 | Nisenboim et al. | |
| 2008/0141302 A1* | 6/2008 | Ota | 725/34 |
| 2009/0102983 A1* | 4/2009 | Malone et al. | 348/734 |
| 2009/0167555 A1* | 7/2009 | Kohanek | 340/825.57 |

OTHER PUBLICATIONS

European Patent Office, Extended Search Report regarding PCT/US2009/037690, dated Feb. 13, 2014, 8 pgs.

* cited by examiner

SYSTEM AND METHOD FOR APPLIANCE CONTROL VIA A PERSONAL COMMUNICATION OR ENTERTAINMENT DEVICE

RELATED APPLICATION INFORMATION

This application claims the benefit of U.S. Provisional Application No. 61/037,759, filed Mar. 19, 2008, the disclosure of which is incorporated herein by reference in its entirety.

BACKGROUND

Portable controlling devices, such as for example universal remote controls, and the features and functions offered by such devices are well known in the art. Increasingly, implementations of these devices incorporate technologies such as color touch screens supporting graphical user interfaces, wireless home network compatibility, command relay stations positioned to control appliances not situated in line of sight of the controlling device, etc.

Contemporaneously, personal communication, productivity, and entertainment devices such as cellular phones, portable email devices, music players, hand-held games, etc. are also increasingly offering features such as graphical user interfaces ("GUI") on color touch screens, wireless Internet capability, etc. Recently, manufacturers of such platforms have begun to encourage the development of native third party applications which enhance the utility of these devices.

SUMMARY OF THE INVENTION

This invention relates generally to a system and method for enabling control of consumer electronic appliances via a graphical user interface implemented on touch screen equipped personal communication or entertainment devices which include wireless local network capability, such as for example the iPhone® or iPod Touch® products from Apple®. Since such devices do not inherently provide a capability to directly communicate commands to the appliances to be controlled, a network connected relay station is provided which receives control requests from a software application installed on a personal communication or entertainment device and converts these requests into appliance compatible infrared ("IR") or radio frequency ("RF") command transmissions.

In this regard, Apple has recently released a software development kit ("SDK") for developing and distributing custom third party applications for the iPhone and iPod Touch devices. This SDK provides a full featured and supported environment for developing software that runs on the devices, allowing accessory applications that leverage the features built into these devices, such as integrated Wi-Fi connectivity, multi-point touch screen interface with gesture recognition, location services, audio and video capabilities, 3-axis accelerometer, proximity sensor, etc. Where necessary for a complete understanding of the invention disclosed herein, exemplary embodiments may be described in terms of the Apple products and SDK. However, it will be appreciated that other personal communication or entertainment devices which offer similar feature sets and application support may be equally suitable as platforms upon which to host comparable features to those described herein, and accordingly any references to specific Apple products herein are not intended to be limiting.

In the exemplary embodiments described herein, the universal remote control GUI is implemented as a native application, i.e., designed to run in the computer and operating system environment of a specific personal communication or entertainment device or family of devices, collectively referred to hereafter as a "smartphone," thus enabling the full capabilities of platform specific features such as for example multi-point touch screen interface, motion based gestures, etc., and thereby providing a robust and high quality user experience. This is as opposed to a so-called "web app," for example one based on HTML pages served to an embedded browser such as described for example in co-pending U.S. patent application Ser. No. 12/147,770 "System and Method for Ubiquitous Appliance Control," of like assignee and incorporated herein by reference in its entirety. While such web apps are useful when a broad spectrum of different host device types are to be supported, in general they may not be able to fully leverage device unique features in the manner described herein.

A better understanding of the objects, advantages, features, properties and relationships of such a portable controlling device system having control capabilities will be obtained from the following detailed description and accompanying drawings which set forth illustrative embodiments and which are indicative of the various ways in which the principles of the system so described may be employed.

BRIEF DESCRIPTION OF THE DRAWINGS

For a better understanding of the various aspects of the portable controlling device system having control capabilities described hereinafter, reference may be had to preferred embodiments shown in the attached drawings in which.

DETAILED DESCRIPTION

Figure 1:
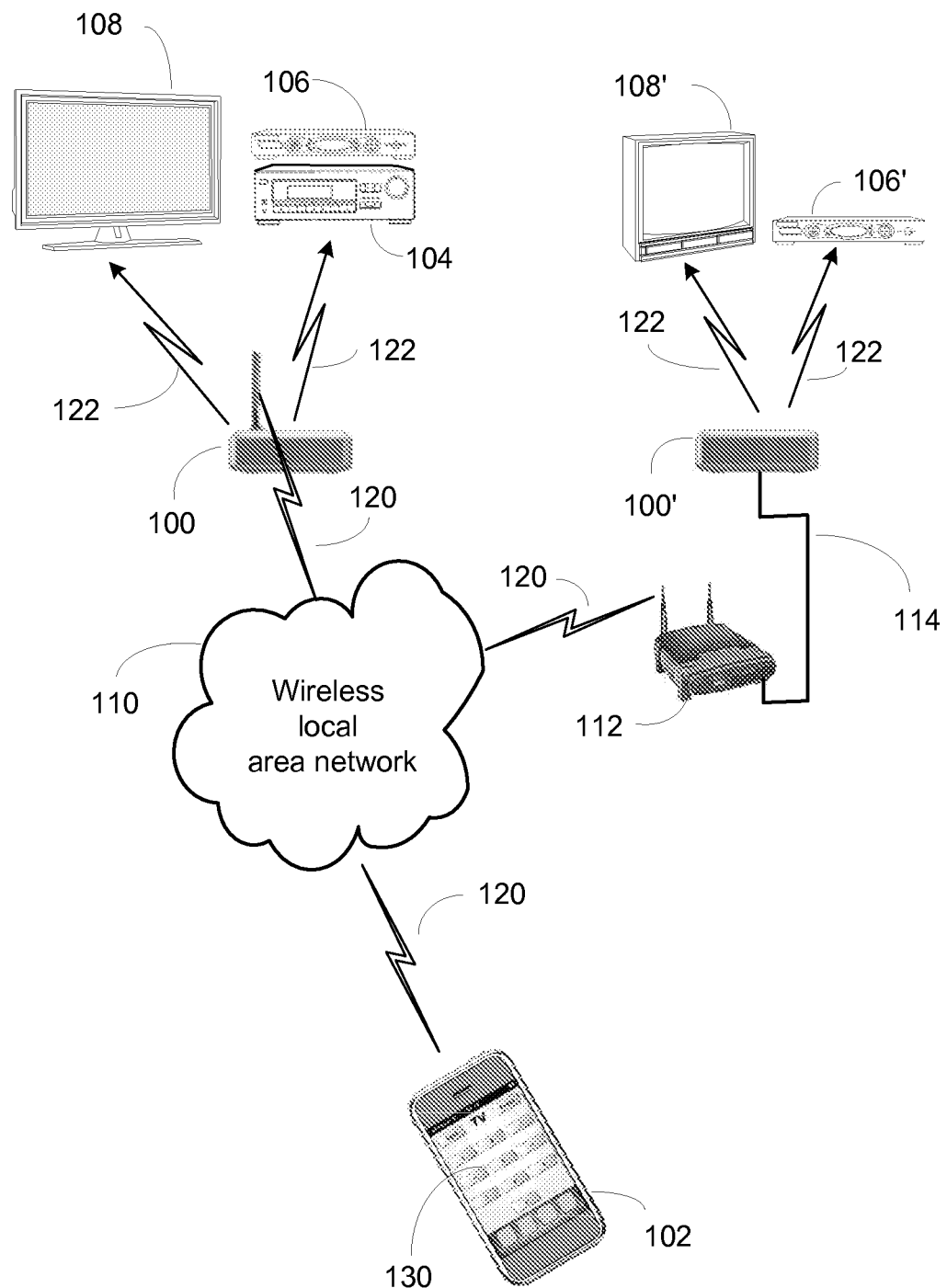
FIG. 1 illustrates an exemplary system in which exemplary personal communication device or entertainment devices may be used as controlling devices.

With reference to FIG. 1, according to the teachings set forth in greater detail below an appliance command relay device 100 is provided which receives control request transmissions 120 from a GUI application 130 loaded on a smartphone or similar device 102, via a local network. Control requests 120 are transmitted wirelessly from the smartphone 102, for example via a WiFi local network 110. These requests may be received directly by a command relay device 100 equipped with a compatible wireless network interface, or may be received by, for example, a wireless router 112 and forwarded to a command relay device 100' via a wired connection 114, for example an Ethernet link. In either case, the command relay device decodes the received control request transmission, ascertains from it a target appliance, for example TV 108, set top box 106, or AV receiver 104, and issues a control command 122 in a form recognizable by that appliance, for example an IR or RF signal of the format used by that appliance's remote control device. In this manner, command relay devices 100 and 100' provide a conduit for the GUI application 130 resident in smartphone device 102 to issue operational commands to appliances 108, 106, 104 and 108', 106' respectively.

While illustrated in the context of a television 108, an STB 106, and an AV receiver 104, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. Further, while the exemplary embodiments presented preferably utilize WiFi-based communication from smartphone device 102, it will be appreciated that in other embodiments different wireless communication protocols such as for example Bluetooth, Zigbee, Z-wave, etc., may be employed as appropriate.

Figure 2:
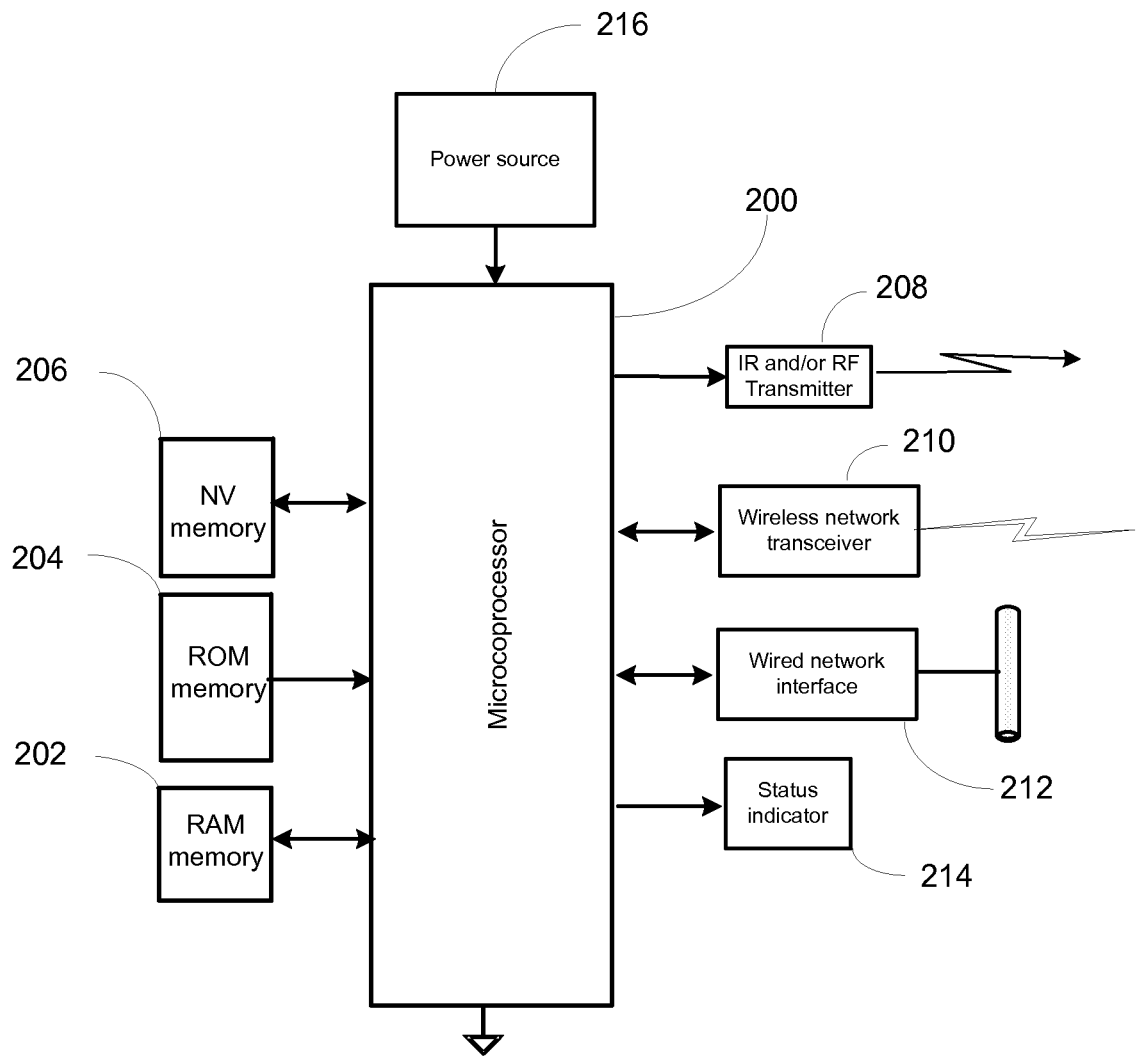
FIG. 2 illustrates in block diagram form an exemplary command relay device of the type used in the exemplary system of FIG. 1.

Turning now to FIG. 2, the architecture of an exemplary command relay device is illustrated in block diagram form. For use in commanding the functional operations of one or more appliances in response to messages received via a wired or wireless network connection, a command relay device 100 may include, as needed for a particular application, a processor 200 coupled to a ROM memory 204, a RAM memory 202, a non-volatile read/write memory 206, circuit(s) 208 for transmission of operating commands to appliances (e.g., IR and/or RF), a wireless network transceiver 210 (e.g., WiFi, Bluetooth, etc.) and/or a wired network interface 212 (e.g., Ethernet) for communication with a local network, a means 214 to provide feedback to the user (e.g., one or more LEDs, LCD display, speaker, and/or the like), and a power source 216.

As will be understood by those skilled in the art, some or all of the memories 202, 204, 206 may include executable instructions (collectively, the program memory) that are intended to be executed by the processor 200 to control the operation of the command relay device 100, as well as data that serves to define appliance control protocols and command values to the operational software (the appliance code data). In this manner, the processor 200 may be programmed to control the various electronic components within the command relay device 100 and process the input and output data thereof, for example, to receive and transmit data via network interfaces 210 and/or 212, to act upon commands and requests embodied in such data, to cause the transmission of appliance command signals via transmission circuits(s) 208 to appliances to be controlled, to control visual feedback device(s) 214, etc. While the memory 204 is illustrated and described as a ROM memory, memory 204 may also be comprised of any type of readable media, such as ROM, FLASH, EEPROM, or the like. Preferably, the memories 204 and 206 are non-volatile or battery-backed such that data is not required to be reloaded after power interruptions. In addition, the memories 202, 204, and 206 may take the form of a chip, a hard disk, a magnetic disk, an optical disk, and/or the like. Still further, it will be appreciated that some or all of the illustrated memory devices may be physically incorporated within the same IC chip as the microprocessor 200 (a so called "microcontroller") and, as such, they are shown separately in FIG. 2 only for the sake of clarity.

To cause the command relay device 100 to perform an action, command relay device 100 is adapted to be responsive to events, such as a received signal from network interface port 210 or 212. In response to an event, appropriate instructions within the program memory (hereafter the "operating program") may be executed. For example, receipt of a control request message from smartphone device 102 may result in the retrieval from the appliance code data the command value and control protocol appropriate for an intended target device and a resulting transmission of the requested command to the intended target appliance, e.g., the STB 106, in a format recognizable by the intended target appliance.

For selecting a set of appliance code data to be associated with an appliance to be controlled, data may be provided to the command relay device 100 that serves to identify an intended target appliance by its type and command protocol. Such data, provided as part of or separately from a command request, may allow the command relay device 100 to identify the appropriate appliance code data elements within a preprogrammed library of appliance code data, to be used to transmit recognizable commands in a format appropriate for such identified appliances. Alternatively, either in place of or in addition to a pre-stored library, appliance code data may be downloaded into command relay device 100 via a network interface(s) 210, 212 either during an initialization phase or on an as required basis.

Operation of the Remote Control Application.

Turning now to FIG. 3, a third party remote control application may be provided for purchase and download into a smartphone, for example through Apple's iPhone App Store—apple.com/iphone/appstore. Once downloaded and installed, the availability of an exemplary remote control application may be represented on a smartphone home screen 300 (such as shown in FIG. 3*a*) by the presence of an icon 302. Activation of icon 302, i.e., execution of the remote control application, may result in a GUI screen 304 such as illustrated in FIG. 3*b*. This GUI may comprise selection icons 306 representative of the appliances that the application and its associated command relay station are currently configured to control, together with configuration icon 308 activatable to add or reconfigure controlled devices and icon 310 activatable to return to the smartphone home screen 300. Activation of a device icon 306, for example the icon labeled "TV," may result in the presentation of a set of appliance control icons 320 such as illustrated in FIG. 3*c*. The specific set of appliance control icons presented may be dependent on the device type selected. In the event more device control functions are available than can reasonably be presented in a single display page, additional display pages may be provided, accessible via the smartphone device's usual page scrolling functionality (for example, a horizontal swipe of a finger in the case of an Apple iPhone.)

Figure 3A:
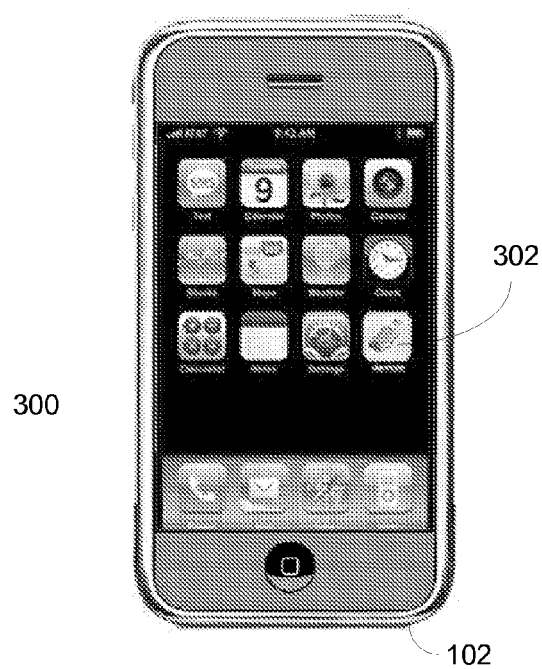
FIG. 3a through 3d illustrate exemplary touch screen displays of a personal communication device executing an exemplary remote control application.
Figure 3B:
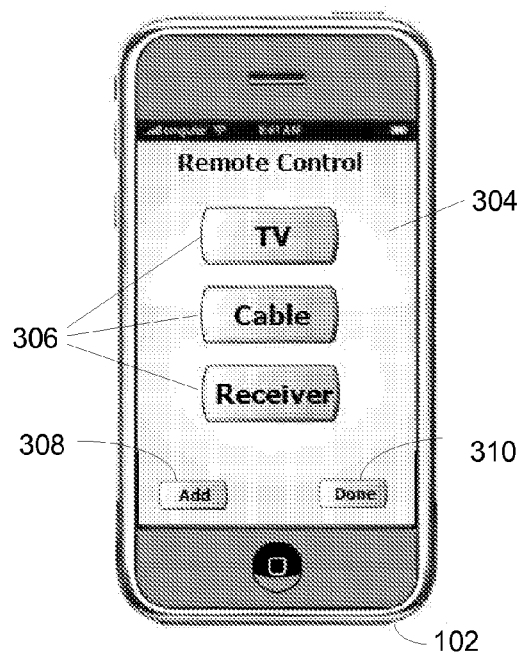
Figure 3C:
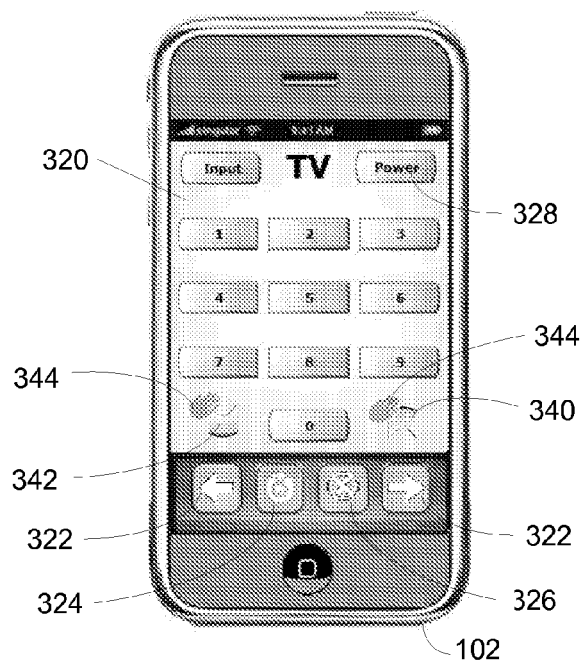
Figure 3D:
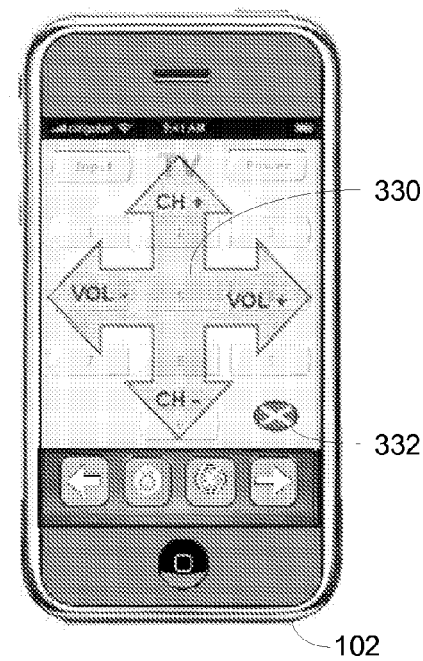

The functionality of various icons illustrated in FIGS. 3*b* through 3*d* will now be described in greater detail in conjunction with the flowcharts of FIGS. 4 and 5, which are representative of the processing performed by an exemplary remote control application, commencing at step 400 when an event such as a screen touch, accelerometer output, proximity sensor, timer expiry, etc., is detected by the smartphone operating system and presented to the exemplary remote control application for processing. It will be appreciated that in these and other flowcharts presented herein by way of illustration, steps associated with common housekeeping functionality as is well known in the art, for example low battery detection, display timeouts, error conditions, etc., may be omitted for clarity. First, at step 402 it is determined if the event is an incoming phone call. If so, at step 404 the current status of the remote control application is saved in order to allow the application to return to the same operational screen when re-launched, for example at the conclusion of a phone conversation. Next, at step 406 it is determined if the automatic mute/pause feature (a user option in the exemplary embodiment) is enabled. If so, at step 408 a "mute" command request targeted to the volume control appliance and/or a "pause" command request targeted to the media playback appliance may be issued to the command relay station, after which at step 440 the exemplary remote control application relinquishes smartphone device control to the phone mode.

If the event is not an incoming call, at step 410 it is determined if the event is the result of a user interaction with the device such a button tap, finger swipe, accelerometer based input, proximity sensor input, etc. If so, it is next determined at step 412 if the current status of the remote application is gesture mode. If so, processing continues at step 500 in FIG. 5, as will described hereafter. If the status of the remote control application is not gesture mode, it is next determined at step 414 if the event was activation of a button icon. If so, at step 416 it is determined if the activated icon was a "close" icon 310 or 326. If so the exemplary remote control application closes and relinquishes smartphone device control to the default phone mode of operation. If a "close" icon was not activated, it is next determined at step 418 if the activated icon was one of the appliance selection icons 306. If so, at step 436 the current appliance to be controlled is set as indicated by the particular appliance selection icon activated, and the first page of command icons applicable to the selected appliance is retrieved and displayed. By way of example, if the selected appliance is a TV, the displayed page may be as illustrated at 320 in FIG. 3c. It will be appreciated that the contents of this first, initially displayed, page may vary with appliance type—for example while a TV appliance page may be as illustrated, a DVD appliance first page may comprise transport controls (play, pause, fast forward, etc.), a cable STB first page may comprise program guide navigation and selection controls, etc.

If the event is not an appliance selection, at step 420 it is next determined if the activated icon is a request to perform an operation internal to the remote control application, for example, via activations of icons 322 for scrolling to a control page for a different type of appliance, icon 324 for returning to the remote control "home" page (for example, appliance selection page 304), icon 326 for exiting the remote control application, etc. If so, at step 422 the requisite action is performed.

If the activated icon is not to result in the performance of an internal operation, the icon activation may represent an appliance command operation, for example a request to issue a TV "power" command initiated via icon 328. If so, at step 432 the requested command function is determined and at step 434 an appropriate command request is issued to command relay device 100. The requested command function may also be internally stored by the remote control application for future reference.

If the event is not an icon activation, at step 428 it is next determined if the event comprises a shake, i.e. rapid movement along two or more axes as reported by the accelerometer hardware of the smartphone device. If so, in an exemplary embodiment this action by the user is interpreted as a request to repeat the last appliance command issued. In this case, at step 430 the command previously stored at step 434 above is retrieved and a request for that command issued to command relay device 100.

If not a shake, at step 436 it is next determined if the event comprises a touch screen gesture by the smartphone user. If so, this event is processed as will be described hereafter in conjunction with FIG. 5. If not, no recognizable event has occurred, and the remote control application terminates current processing at step 438.

If the detected event is not an incoming call or a user interaction, at step 424 it is determined if the event is a timer expiry. If not, no recognizable event has occurred, and the remote control application terminates current processing at step 438. If so, at step 426 any gesture mode status and screen overlay display(s) are cleared. By way of explanation, during certain gesture activities a semi-transparent overly may be displayed as described in greater detail hereafter in conjunction with FIG. 5. While this display is present, a time-out may be established in order to remove the display overlay after a predetermined period of inactivity.

Figure 5:
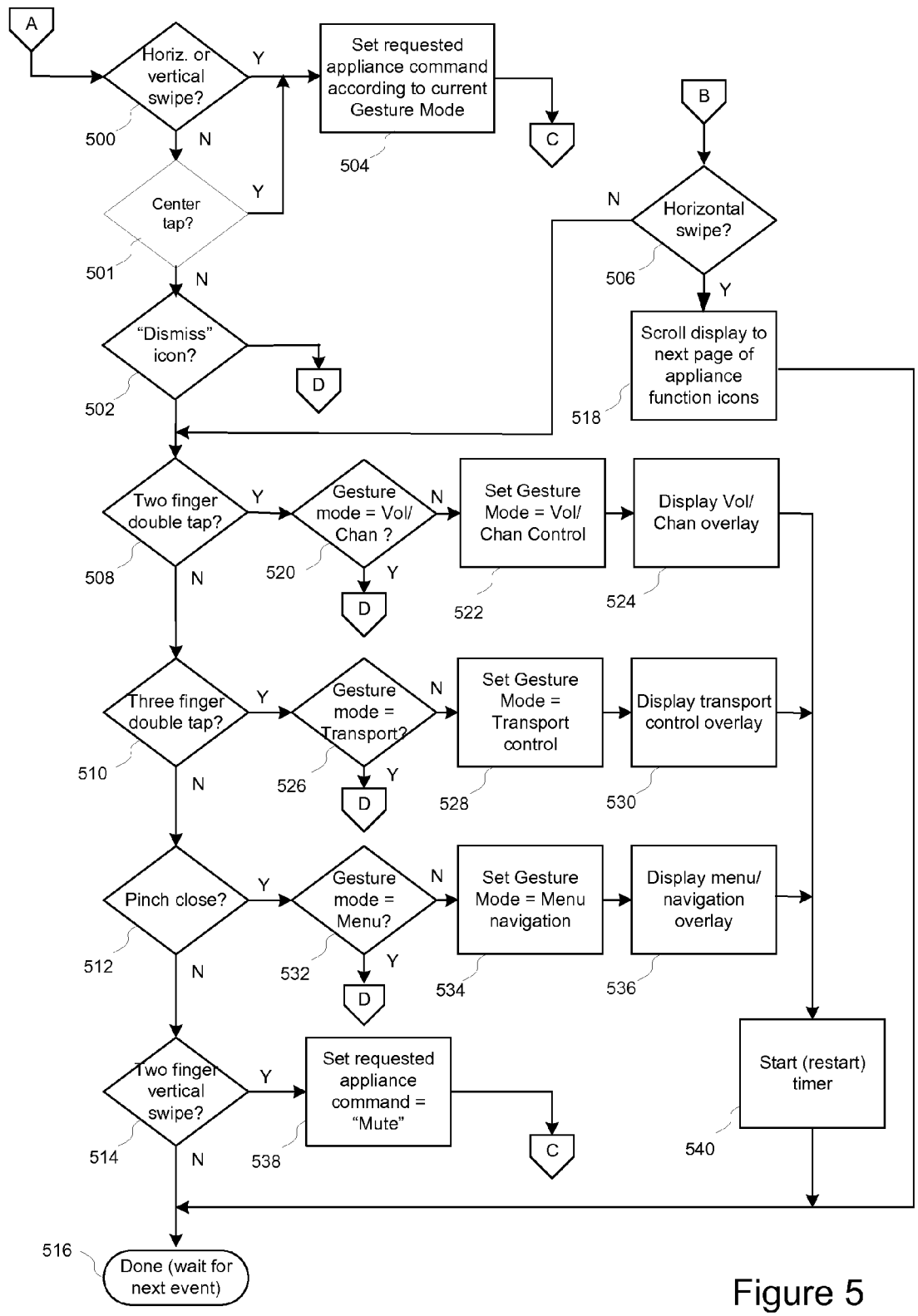

Turning now to FIG. 5, if at step 436 it was determined that the user input constituted a gesture (i.e., a touch screen interaction of a particular type, as detectable by the smartphone vendor-supplied operating system), at step 506 it is determined if the gesture was a simple scroll request, for example a horizontal swipe which may be interpreted as a request to scroll to the next page of appliance command icons in instances where multiple pages of command functions exist for a particular appliance type. If so, the request is processed at step 518 and the remote control application thereafter terminates current processing at step 516. If not a scroll request, at step 508 it is next determined if the gesture comprised a two finger double tap. If so, in the exemplary embodiment this may be interpreted as a user request to enter into a volume and channel control mode. Additionally, in the exemplary embodiment, repeat of a mode setting gesture while already in that mode may be interpreted as a request to terminate that mode of operation. Accordingly, at step 520 it is first determined if the remote control application is already operating in the volume and channel control mode. If so, processing continues at step 426 to clear that mode. If not, at step 522 the gesture mode status is set to "Vol/Chan control," at step 524 a semi-transparent overlay, for example as illustrated at 330 of FIG. 3d, is displayed to indicate the mode of operation, and at step 540 a gesture mode timer is started (or restarted, if the remote control application was already operating in one of the gesture modes), after which processing of the current event completes at step 516.

If not a two finger double tap, at step 510 it is determined if the event comprised a three finger double tap. If so, in the exemplary embodiment this may be interpreted as a user request to enter into a transport control mode, i.e., offering control of the "play", "pause", "fast forward", "rewind", etc. functions of a media playback appliance, and at steps 526 through 530 the request is processed in a similar manner to that previously described, resulting in the display of a transport function semi-transparent overlay (not illustrated).

If not a three finger double tap, at step 512 it is determined if the event comprised a pinch close gesture (two digits, typically a finger and thumb, placed in contact with the touch sensitive surface and moved in opposing directions towards one another). If so, in the exemplary embodiment this may be interpreted as a user request to enter into a menu navigation mode, i.e., offering control of the "select", "up", "down", "left", "right," etc. functions of an appliance, and at steps 532 through 536 the request is processed in a similar manner to that previously described, resulting in the display of a menu navigation function semi-transparent overlay (not illustrated).

If not a pinch close gesture, at step 514 it is next determined if the event comprised a two finger vertical swipe. If so, in the exemplary embodiment this may be interpreted as a user request to issue a mute command to the current audio rendering appliance, and at step 538 the requested appliance command is set for issuance to command relay station 100. If not a two finger vertical swipe, no recognizable event has occurred, and the remote control application terminates current processing at step 516.

When the remote control application status indicates that it is operating in the gesture mode (i.e., a mode previously set at one of steps 522, 528 or 534 and not dismissed or timed out) receipt of a user interaction event at step 412 causes processing to continue at step 500 where it is determined if the event is a horizontal or vertical finger swipe. If so, the appropriate appliance command is selected at step 504 and a request issued to command relay device 100 via step 434. Selection of appliance type and command is based on the current gesture status, for example an upward swipe may indicate "channel up" if in volume/channel control mode, "stop" if in transport control mode, "menu up" if in menu navigation mode, etc. If not a finger swipe, at step 501 it is next determined if the event is a finger tap in the central portion of the screen. If so, processing continues at step 504 with the selection of an appropriate command (for example "mute", "pause", or "select" dependent once again on the current gesture status.) If not, at step 502 it is determined if the event is activation of dismiss icon 332, indicating that the user wishes to exit gesture mode. If so processing continues at step 426 where the gesture mode status and screen overlay display are cleared. If not processing continues at step 508 as previously described.

It will be appreciated that additional or alternative gestures and/or command functions may be implemented in this or other embodiments dependent on the gesture recognition capabilities of specific smartphone or entertainment device platforms, including those that may comprise two or more types of gestures performed simultaneously or in concert with one another in order to accomplish more complex command functions. By way of example, in one embodiment of the present invention a ramping fast forward or reverse function may be enabled via a single button press and hold input on the touch screen, during which accelerometer based input (e.g., tilting the smartphone to the right or left) gradually increases or decreases the rate at which media is fast-forwarded or reversed. Furthermore, in some embodiments the assignment of particular gestures to specific command functions may configurable at user option. Accordingly, it is to be understood that the gesture functionality presented in the foregoing paragraphs is by way of example only and not intended to be limiting.

Request Protocol Between Remote Control Application and Command Relay Device.

In an exemplary embodiment command request and response data packets of the format described below may be exchanged between a remote control application and a command relay device via a wireless 110 and/or wired 114 local area network.

A command request from remote control application to a command relay device comprises the following data fields (values in parentheses after each field name represent the size of that field in bytes, i.e., the number of digits or characters):

SystemID(4), SpecRevision(4), RcdLength(2), RequestType(1), ApplianceType(2), ApplianceNum(4), CommandCode(2), KeyFlag(1)

Where:

SystemID may be a unique system identification number established for example during an initial discovery and pairing process between a remote control application and a command relay device with which it is to be associated.

SpecRevision may be a version/revision indicator of the interface specification to which this data packet format conforms, for example to ensure compatibility between devices or for determining data packet field locations and values.

RcdLength may be the number of data characters following this field (i.e., excluding itself)—"10" in the case of this exemplary command request packet.

RequestType may be the type of request—In the example presented, "01" may represent a request to commence transmitting an appliance command, "02" may represent a request to continue transmitting an appliance command, and "00" may represent a request to cease transmitting an appliance command. See the narrative below regarding the KeyFlag field for further insight regarding this aspect of the request protocol between the exemplary remote control application and the command relay device.

ApplianceType may be the type of appliance to be commanded, for example according to the following table:

TABLE 1

Exemplary appliance types.

| Appliance Type | Device Name |
|---|---|
| 00 | TV |
| 01 | Cable STB |
| 02 | Video Accessory |
| 03 | Satellite STB |
| 04 | VCR |
| 05 | Laser Disk |
| 06 | DVD |
| 07 | Tuner/AV Receiver |
| 08 | Amplifier |
| 09 | CD |
| 10 | Home Control |
| 11-31 | Reserved |

ApplianceNum may be a four digit number which identifies a set of command data and transmission format information, i.e., the appliance code data, required to control a particular appliance or family of appliances. This may for example represent a set up code or appliance identifier as is well known in the universal remote control art, see for example "ATLAS OCAP 5-Device Remote Control" user manual, Revision 3.0, by Universal Electronics Inc., incorporated herein by reference in its entirety.

CommandCode may be a two digit identifier of the specific command requested, for example according to the following table:

TABLE 2

Exemplary appliance command functions

| Command # | Standard Function |
|---|---|
| 01 | POWER TOGGLE |
| 02 | POWER ON |
| 03 | POWER OFF |
| 04 | CHANNEL UP |
| 05 | CHANNEL DOWN |
| 06 | VOLUME UP |
| 07 | VOLUME DOWN |

TABLE 2-continued

Exemplary appliance command functions

| Command # | Standard Function |
|---|---|
| 08 | MUTE |
| 09 | DIGIT 1 |
| 10 | DIGIT 2 |
| 11 | DIGIT 3 |
| 12 | DIGIT 4 |
| 13 | DIGIT 5 |
| 14 | DIGIT 6 |
| 15 | DIGIT 7 |
| 16 | DIGIT 8 |
| 17 | DIGIT 9 |
| 18 | DIGIT 0 |
| 19 | CHANNEL ENTER |
| 20 | +100 |
| 21 | LAST CHANNEL |
| 22 | INPUT |
| 23 | EXIT |
| 25 | STOP |
| 26 | PAUSE |
| 27 | REWIND |
| 28 | FAST FORWARD |
| 29 | RECORD |
| 30 | SKIP FWD |
| 31 | SKIP REVERSE |
| 32 | LIVE |
| 33 | SOURCE MENU |
| 34 | DEVICE MENU |
| 35 | GUIDE |
| 36 | EXIT |
| 37 | BACK |
| 38 | CURSOR UP |
| 39 | CURSOR DOWN |
| 40 | CURSOR LEFT |
| 41 | CURSOR RIGHT |
| 42 | MENU SELECT |
| 43 | PAGE UP |
| 44 | PAGE DOWN |
| 45 | FAVORITE |
| 46 | DISPLAY |
| 47-99 | Reserved |

KeyFlag may be a directive which may control the style of command transmission to the appliance. By way of example, in an exemplary embodiment KeyFlag="1" may request that the appliance command be issued once by the command relay device, while KeyFlag="0" may request that the appliance command be continuously transmitted by the command relay device until an explicit "cease transmitting" request is received—used, for example, in the case of ramping functions such as volume control where a command transmission should be continuously repeated for as long as a user keeps a key depressed, a channel surfing function in which channels are to be incrementally viewed, etc.

A response from a command relay device to a remote control application may comprise the following fields:

SystemID(4), SpecRevision(4), RcdLength(2), RequestType(1), ApplianceType(2), ApplianceNum(4), CommandCode(2), Status(2)

Wherein the first seven fields may be as described above and may comprise an echo of the received request by way of confirmation, and the final Status field may comprise one of the values shown in Table 3 below, representing the completion status of the command request.

TABLE 3

Exemplary status response values

| Status value | Message |
|---|---|
| 00 | Completed without error |
| 01 | Invalid appliance type |
| 02 | Invalid appliance number |
| 03 | Invalid request type |
| 04 | Invalid command code |
| 05 | No command data available |
| 06 | Data Packet Format Error |
| 07 | Continuous command transmission aborted by timeout |
| 08-99 | Reserved |

Figure 6:
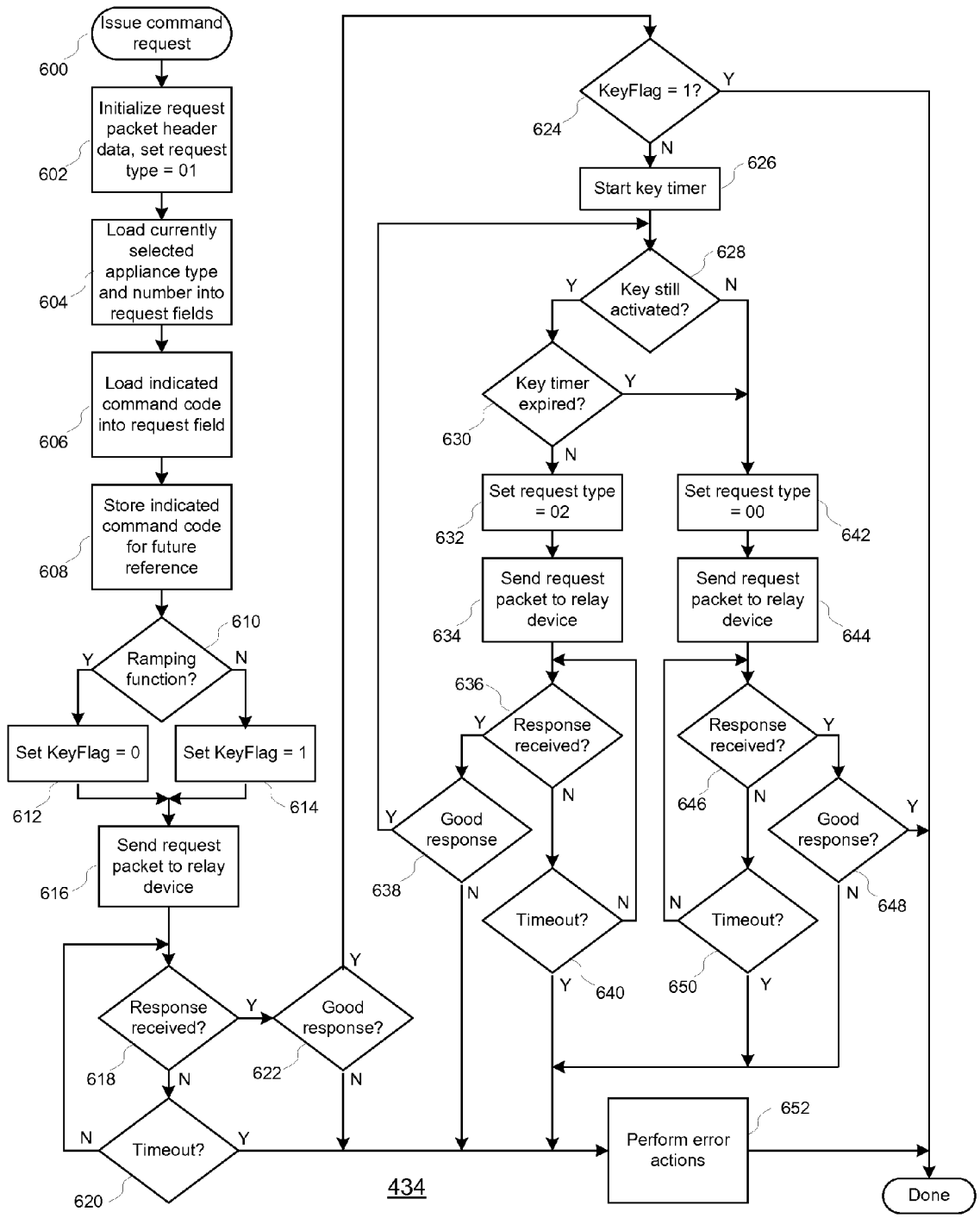
FIG. 6 further illustrates the operation of an exemplary remote control application when issuing a request to an exemplary command relay device.

Turning now to FIG. 6, the steps performed by an exemplary embodiment of a remote control application in issuing a command request in accordance with the exemplary data protocols above will be described in further detail, i.e., a series of steps which may correspond to the process of step 434 of FIG. 4. First at step 602 exemplary packet header data is initialized, comprising for example appropriate SystemID, SpecRevision, and RcdLength fields together with a RequestType field value of "01" (commence transmitting a command). Next, at steps 604 and 606, exemplary ApplianceType, ApplianceNum, and CommandCode fields are populated according to the indicated appliance and function request. At step 608 the requested command is also saved locally for possible future use in processing a possible "repeat last command" request as previously described in conjunction with FIG. 4. At step 610 it is determined if the requested is for a ramping function. By way of example, when an exemplary remote control application is operating in the volume/channel gesture input mode illustrated in FIG. 3d, a left to right finger swipe terminating with the finger removed from contact with the touch sensitive surface may be interpreted as a request to issue a single instance of a "volume up" command to the designated appliance, i.e., a non-ramping function, whereas a left to right finger swipe terminating with the finger remaining in stationary contact with the touch sensitive surface may be interpreted as a request to continuously issue "volume up" commands to the designated appliance until such time as the finger is lifted, i.e., a ramping function. At steps 612 and 614 the KeyFlag field value is set according to this determination. At step 616, the completed request data packet is forwarded to an exemplary command relay device via wireless local area network 110. As will be appreciated, the data packet may be encapsulated for transmission purposes within further header fields, control parameters, error detection and/or correction data, etc., as appropriate for the wireless protocol being employed, for example WiFi, Bluetooth, Zigbee, Zensys, etc., all as well known in the art.

After transmission of the request data packet, at steps 618, 620 and 622 the remote control application waits for a response from the exemplary command relay device. If the received response is negative, i.e., any value other than "00" in the example presented, or if no response is received within a predetermined amount of time, an error condition exists and is processed at step 652. The exact actions taken may depend upon both the type of error and the activity currently being requested. By way of example without limitation, a timeout or receipt of a status code such as 06 "data packet format error" may result in re-transmission of the request packet; receipt of status code 05 "no command data available" may result in graying out of particular button icons in certain display pages; receipt of status code 02

"invalid appliance number" may result in a message to the user suggesting re-initialization of appliance settings within the smartphone device and/or downloading of additional code data to command relay station 100; while other error status codes may result in display of error messages requesting possible action by the user such as reconfiguring or reinitializing devices, etc.

If a good status response is received, at step 624 the remote control application next determines if the KeyFlag value of the acknowledged request was "01." If so, the function requested was the transmission of a single instance of the appliance command represented by CommandCode, and processing is complete. If not, the request is for a continuous transmission of the appliance command for as long as the key or other user input remains activated. In that case, at step 626 a predetermined key timeout is first initiated as a precaution in the event that the continued key activation is not the result of a user action but rather an error condition—for example a smartphone device has become lodged between couch cushions, an object has been inadvertently placed on or has fallen onto the touch screen surface, etc. Should this timeout expire, the remote control application will subsequently act as if the key had been released regardless of its activated state. Then, at step 628 it is determined if the key or input is in fact still activated and if so, provided the above referenced key timeout has not expired (step 630), at steps 632 and 634 a further request packet is transmitted to the exemplary command relay device, with RequestType set to "02—continue transmitting." As will be detailed hereafter, in certain embodiments an exemplary command relay device which is transmitting a command continuously may require periodic receipt of such "continue transmitting" requests from the remote control application in order to sustain the transmission, this representing a safety feature to prevent runaway of an appliance adjustment function in the event that communication between the remote control application and the command relay device is interrupted prior the issuance of a "cease transmitting" request.

Upon completion of transmission of the packet, the remote application once again waits for a response from the exemplary command relay device. If a bad response or timeout occurs, the error condition is processed at step 652 as previously described. If a good response is received, the sequence is repeated starting at 628 until such time as the key or input is no longer activated or the key timer times out. Upon occurrence of either of these events, at steps 642 and 644 a request packet is transmitted to the exemplary command relay device, with RequestType set to "00—cease transmitting", the ensuing response is evaluated at steps 646, 648 and 650, and processing is complete.

Operation of the Command Relay Device.

Figure 7:
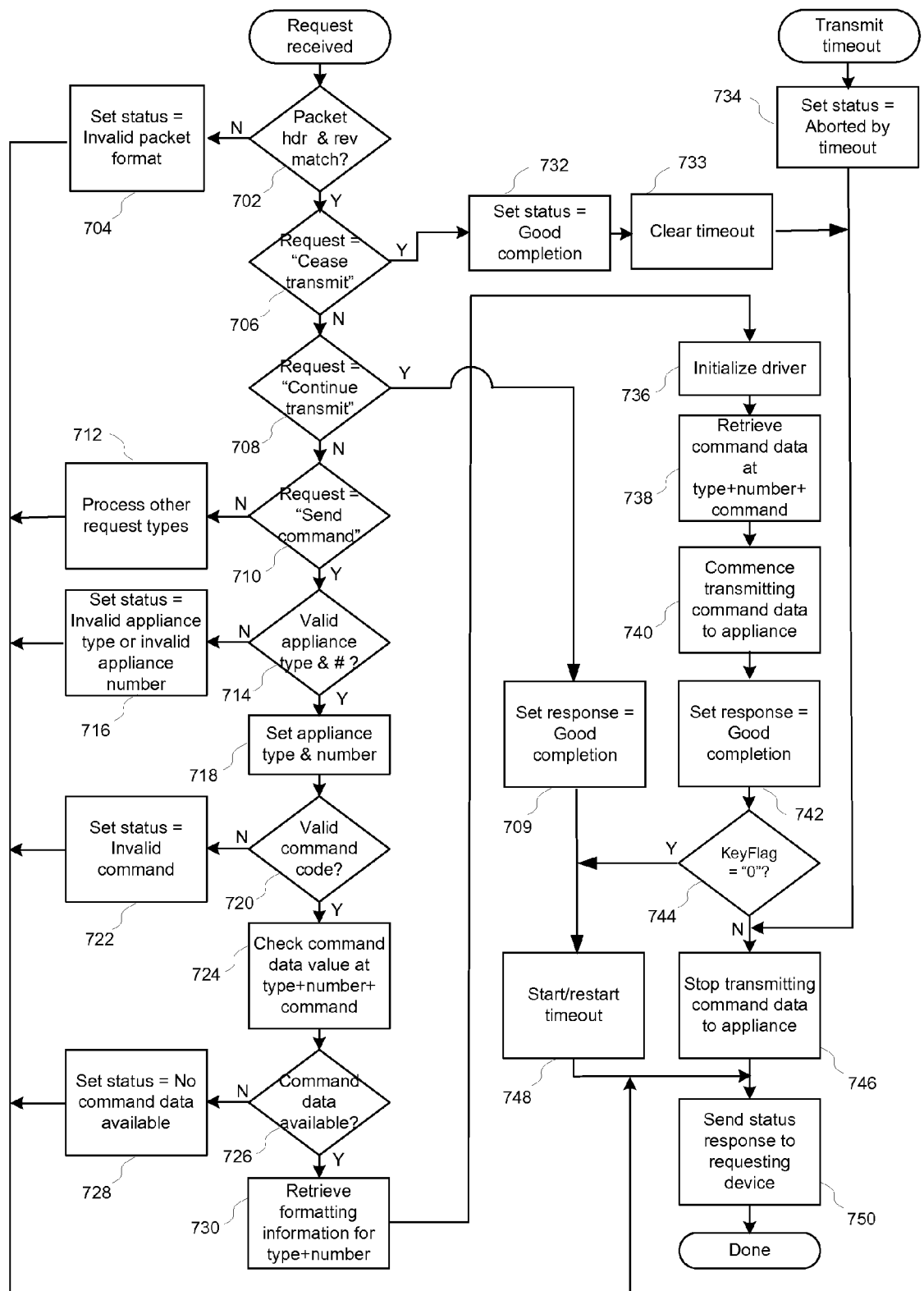
FIG. 7 illustrates the operation of an exemplary command relay device when processing a request received from an exemplary remote control application.

Turning now to FIG. 7, the steps performed by an exemplary embodiment of a command relay device in processing a command request in accordance with the exemplary data protocols above will be described in further detail. Upon receipt of a command request data packet in conformance with the protocol described previously, at initial step 702 the packet header data is examined. For example, the exemplary SystemID and SpecRevision fields may be inspected to determine if they match expected values. An exemplary RcdLength field may also be evaluated at this step to determine if a complete data packet has been received. If any of these tests fail, a data packet that is broken and/or of unknown format has been received, and accordingly at step 704 a status "data packet format error" is set whereafter the balance of the received packet fields are ignored, a response containing that status is returned to the originating remote control application at step 750, and processing is complete.

Next, at step 706 an exemplary RequestType field is examined to determine if the received data packet is a "00—cease transmitting" request. If so, at step 732 and 733 a status "good completion" is set and any timeout timer is cleared, whereafter any ongoing appliance command transmission is cancelled at step 746, a response containing the good status is returned to the originating remote control application at step 750, and processing is complete.

If the exemplary RequestType field is not a cease transmitting request, at step 708 it is determined if the received RequestType field is a "02—continue transmitting" request. If so, at step 709 a status "good completion" is set, whereafter at step 748 an exemplary transmission timeout is reset, a response containing the good status is returned to the originating remote control application at step 750, and processing is complete.

If the exemplary RequestType field is not a continue transmitting request, at step 710 it is determined if the received RequestType field is a "01—transmit command" request. If not, other type of requests may be processed at step 712. By way of example these may include device discovery and pairing transactions, initial and setup and configuration communications, etc. without limitation, as required by particular embodiments.

If the request is for a command transmission, at step 714 the exemplary ApplianceType and ApplianceNum fields are evaluated. If the requested appliance type and/or number are invalid, i.e., do not correspond to an identifiable portion of the appliance code data currently stored in the memories 202, 204, 206 of command relay device 100, an appropriate error status is set at step 716 and processing continues at step 750 as previously described.

If the requested appliance type and number are valid, at step 718 these are registered as the appliance to be controlled, for example by establishing a pointer to the appropriate portion of stored appliance code data. At step 720, the contents of the exemplary CommandCode field are then examined. If there is not a recognizable command code, an error status is set at step 722 and processing continues at step 750 as previously described. If a valid command code is present, at step 724 and 726 the entry within the stored appliance code data which corresponds to the request appliance type, number, and command is examined. If no data is available, an error status is set at step 728 and processing continues at step 750 as previously described. By way of explanation, not all appliances necessarily support every function defined in the universe of possible appliance commands. By way of specific example, a particular appliance may not support a discrete "power on" function even though in the exemplary embodiment illustrated in Table 2 this is a permissible command ("02"), in which case the appliance code data entry corresponding to that appliance type/number/command may be null, resulting in the "no command data available" status of step 728.

If valid data is present, then at steps 730 and 732 the software driver associated with IR or RF transmitter 208 is initialized using the stored formatting information corresponding to the selected appliance type and number. Such formatting information may include for example a carrier frequency, duty cycle, encoding schema, frame length, etc., as well known in the art. Thereafter, at steps 738 and 740 the command data is retrieved and transmission commenced. Once command transmission is initiated, the response status is set to "good" at step 742.

The exemplary KeyFlag field is then examined at step 744. If the content is non-zero, processing continues at step 746 and command transmission is stopped after completion of a single instance. In this regard, it will be appreciated that a single instance of a command may comprise transmission of more than one frame of data, depending on the appliance protocol is use. By way of specific example, the error detection mechanism of a certain manufacturer's IR command protocol may require that a frame of command data be repeated multiple times for comparison purposes before it will acted upon. Accordingly it is to be understood that at step 746 transmission will only cease after completion of all requirements of the particular appliance command protocol currently in use. Once complete, processing continues at step 750 by issuing a completion response to the requesting smartphone device, after which processing is complete.

If the content of the exemplary KeyFlag field is zero, the requesting smartphone device wishes to initiate a ramping function, and accordingly at step 748 an exemplary transmit timeout is initiated, whereafter a completion status is returned to the requesting smartphone device and processing completes with command transmission ongoing.

As mentioned previously, the purpose of the timeout initiated at step 748 is to prevent a runaway command situation in the event that communication between smartphone 102 and command relay device 100 is interrupted and a timely "Cease transmitting" request is not received by the command relay device. Accordingly, if this timeout expires prior to receipt of any "Continue transmitting" or "Cease transmitting" request from the smartphone device, at step 734 a response status "Aborted by timeout" is set, after which any ongoing command transmission is terminated and that status is communicated to the smartphone device.

Initialization of the System.

A newly-installed remote control application when run for the first time on a smartphone device may initiate a discovery process to locate and pair with a command relay device 100 attached to the local wireless network. In certain embodiments, upon discovering a command relay device the remote control application will instruct that command relay device to visually or audibly signal the user, for example using status indicator 214, and then prompt the user for a confirmation input, for example via the touch screen. If no user confirmation is received within a predetermined period of time the remote control application may resume the discovery process after flagging the current command relay device so as to not identify it again during the current run instance. In this manner allowance may be made for the presence of more than one command relay device on the same local network.

Once paired with a command relay device, in certain embodiments the remote control application may immediately enter an "add device" mode soliciting user configuration of the appliance types, brands and/or models to be controlled. Alternatively, the remote control application may simply display a blank home screen (similar to screen 304 sans appliance selection icons 306) awaiting manual user initiation of an add device mode, for example via activation of icon 308. In either event, multiple methodologies for identification of appliances to be controlled, whether performed locally or by interaction with a Web-based service are well known in the art, by way of example without limitation, as may be found described in U.S. Pat. No. 4,959,810 "Universal Remote Control Device" or U.S. Pat. No. 7,218,243 "System and Method for Automatically Setting Up a Universal Remote Control," both of like assignee and incorporated herein by reference in their entirety. In some embodiments, appliance identification may be performed by interacting with a web-based service which may convert user-supplied appliance brand and model information into appliance type and number values suitable for use by the smartphone application. In some instances, supplemental appliance code data not already present in the memories of command relay device 100 may be downloaded into the device via network connections 114 or 120. In certain embodiments this may occur based on a web service's prior knowledge of the current library of appliance code data in command relay device 100, while in other embodiments this may be triggered, for example, by a smartphone application upon receipt of an "Invalid appliance number" or "Invalid appliance type" status response from command relay device 100.

Figure 4:
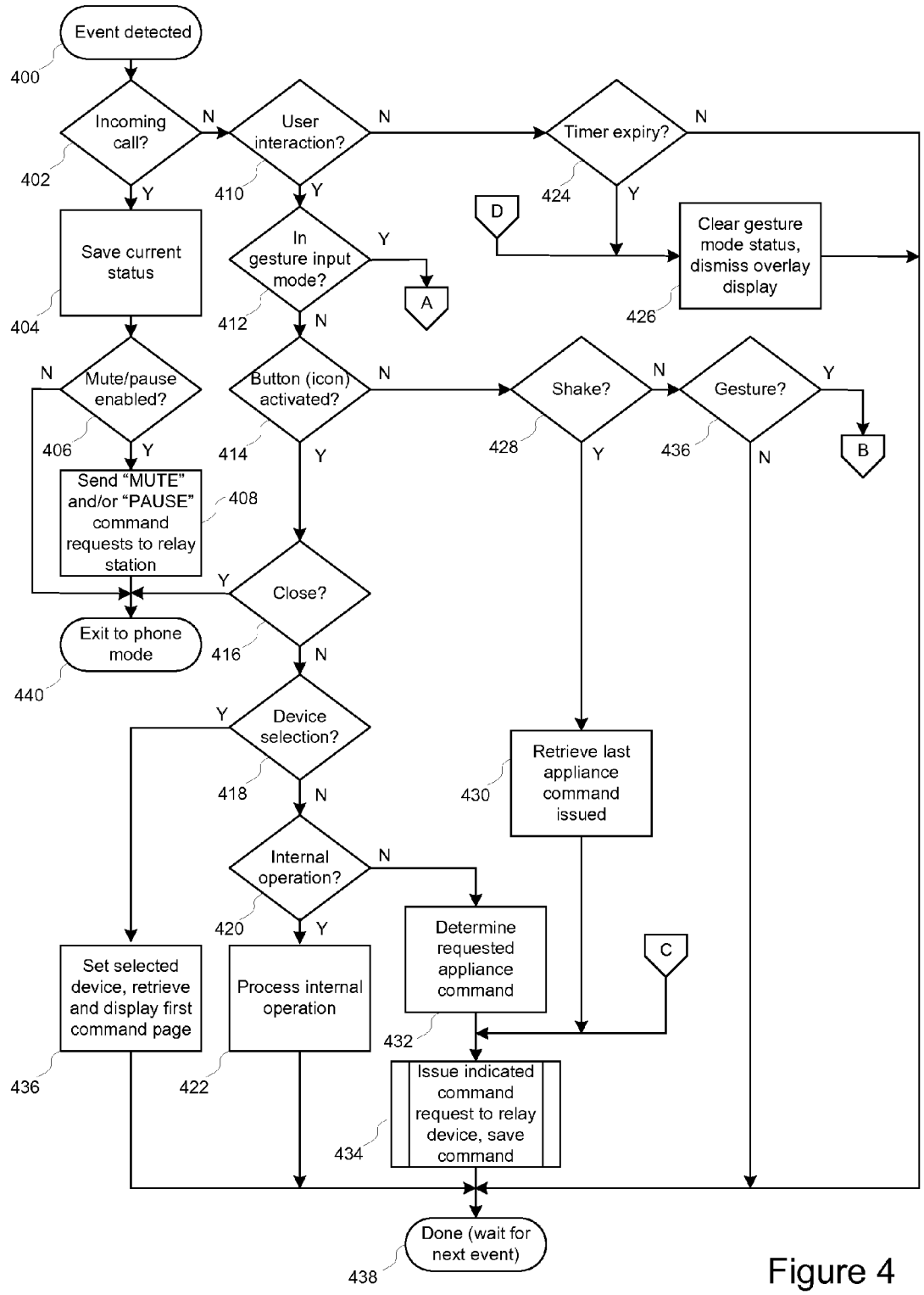
FIGS. 4 and 5 illustrate the operation of the exemplary remote control application of FIG. 3 in flow chart form.

In some embodiments, various further options may be configurable within the remote control application either during the initialization process or separately thereafter, for example the optional pause and/or mute features illustrated at steps 406 and 408 of FIG. 4 may be enabled or disabled, individually or jointly. Additionally the assignment of appliance type, command functions and/or remote control application local functions to specific gestures may be user configurable. It will be appreciated that in certain embodiments, the device type to be associated with a specific gesture may be globally assignable, i.e., effective without regard to the currently selected device of the remote control application (for example, the volume control functions may be globally assigned to TV 104, while channel up/down functions may be globally assigned to set top box 106), while in other embodiments the device type may be that currently selected within the remote control application. In this connection, functions represented by conventional button icons which have also been assigned a gesture, for example the channel up icon 340 and channel down icon 342 of FIG. 3c may be visually identified as such by the addition of a badge or tag 344 appended to or placed in the proximity of that function icon.

While various concepts have been described in detail, it will be appreciated by those skilled in the art that various modifications and alternatives to those concepts could be developed in light of the overall teachings of the disclosure. For example, it will be appreciated that alternative and/or additional gestures may be utilized in various embodiments of the invention, and that the GUI displays and functionality presented herein are illustrative only. For example, in certain embodiments icons 322, 324 and 326 may be utilized to access user-assignable favorite channels rather than the internal functions described herein. Further, certain embodiments of the remote control application may take advantage of additional capabilities of the smartphone platform in which they are resident. For example a remote control application resident in a smartphone platform capable of spatial awareness (e.g., via GPS, wireless network detection, or other location based technology) may automatically select appropriate appliances to be controlled as a user moves from room to room and/or to automatically alter which appliance is assigned to various gestures. Additionally, while combination gestures (for example a finger swipe followed by a tap, tilt, shake, etc.) may be presented in the exemplary embodiments illustrated herein as being fully interpreted within a smartphone platform, it will be appreciated that in alternative embodiments each of the individual gesture component actions may be separately reported to a command relay device and interpreted thereat.

While described in the context of functional modules and illustrated using block diagram and flow chart formats, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A system for use in controlling operating functions of a target controllable device, comprising:
   a hand-held device adapted to receive a gesture based input and having programming for transmitting a signal having data representative of the gesture based input, data representative of device type for the target controllable appliance, and data representative of a command code data set identifier; and
   an intermediate device in communication with the hand-held device and the controllable device, the intermediate device having programming which causes the intermediate device to respond to a receipt of the signal from the hand-held device by using the data representative of the device type for the target controllable appliance and the data representative of the command code data set identifier to select a command code data set from a library of command code data sets stored in a memory of the intermediate device, using the data representative of the gesture based input to identify at least one command code in the selected command code data set, and using the identified at least one command code in the identified command code data set to create a command signal to be communicated to the target controllable device wherein the command signal has a format appropriate for controlling an operating function of the target controllable device that is associated with the gesture based input.

2. The system as recited in claim 1, wherein the library of command code data sets is pre-stored in the memory.

3. The system as recited in claim 1, wherein at least a portion of the library of command code data sets is downloaded from a network server device and then stored in the memory.

4. The system as recited in claim 1, wherein the hand-held device comprises a touch screen interface and the gesture based input comprises a sensed interaction with the touch screen interface.

5. The system as recited in claim 4, wherein the gesture based input comprises a sensed swiping motion on the touch screen interface.

6. The system as recited in claim 4, wherein the gesture based input comprises a sensed, plural, simultaneous touching on the touch screen interface.

7. The system as recited in claim 4, wherein the gesture based input comprises a sensed, simultaneous swiping motion and touching on the touch screen interface.

8. The system as recited in claim 1, wherein the hand-held device comprises an accelerometer and the gesture based input comprises a movement of the hand-held device sensed via the accelerometer.

9. The system as recited in claim 1, wherein the programming of the intermediate device functions to transmit to the hand-held device a status signal having data indicative of a status of the intermediate device resulting from receipt of a signal transmitted from the hand-held device.

10. The system as recited in claim 1, wherein the data representative of the gesture based input comprises data indicative of an operating function type.

11. The system as recited in claim 1, wherein the data representative of the gesture based input comprises data indicative of an instruction for the intermediate device to repeatedly communicate a command signal to the target controllable device.

12. The system as recited in claim 11, wherein the instruction causes the intermediate device to repeatedly communicate a volume control command signal to the target controllable device.

13. The system as recited in claim 11, wherein the instruction causes the intermediate device to repeatedly communicate a channel tuning control command signal to the target controllable device.

14. The system as recited in claim 1, wherein the data representative of the gesture based input comprises data indicative of a request type for the intermediate device.

15. The system as recited in claim 1, wherein the intermediate device communicates with the target controllable device via a wireless signal transmission.

16. The system as recited in claim 1, wherein the hand-held device communicates with the intermediate device via a wireless signal transmission.

17. The system as recited in claim 1, wherein the programming for transmitting a signal having data indicative of the gesture based input comprises a remote control user interface application resident on the hand-held device.

18. The system as recited in claim 17, wherein the hand-held device comprises a touch-screen display and the remote control user interface application causes display of one or more screens displaying icons representative of functional operations of the target controllable device which are to be interacted with to provide the gesture based input.

19. The system as recited in claim 18, wherein the remote control user interface application is configurable to provide one or more screens displaying icons representative of functional operations of a plurality of controllable devices including the target controllable device.

20. The system as recited in claim 1, wherein the operating function of the target controllable device that is associated with the gesture based input is user configurable.

21. The system as recited in claim 1, wherein the target controllable device that is associated with the gesture based input is user configurable.

* * * * *